US008122366B2

(12) United States Patent  (10) Patent No.: US 8,122,366 B2
Harrold et al.  (45) Date of Patent: Feb. 21, 2012

(54) SYSTEMS AND METHODS FOR VISUALIZATION OF EXCEPTION HANDLING CONSTRUCTS

(75) Inventors: Mary Jean Harrold, Atlanta, GA (US); Carsten Goerg, Atlanta, GA (US); Hina Shah, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 301 days.

(21) Appl. No.: 12/560,689

(22) Filed: Sep. 16, 2009

(65) Prior Publication Data

US 2011/0066959 A1    Mar. 17, 2011

(51) Int. Cl.
*G06F 3/00* (2006.01)

(52) U.S. Cl. ........................... 715/762; 715/763

(58) Field of Classification Search ................ 715/762, 715/763; 714/48
See application file for complete search history.

(56) References Cited

U.S. PATENT DOCUMENTS

| | | | | |
|---|---|---|---|---|
| 6,412,109 | B1* | 6/2002 | Ghosh | 717/155 |
| 7,559,060 | B2* | 7/2009 | Schmidt et al. | 718/100 |
| 7,577,961 | B1* | 8/2009 | Bissett et al. | 719/318 |
| 7,844,975 | B2* | 11/2010 | Yajaman et al. | 719/319 |
| 2007/0150900 | A1* | 6/2007 | Hankins et al. | 718/108 |
| 2007/0266444 | A1* | 11/2007 | Segal | 726/27 |
| 2008/0127205 | A1* | 5/2008 | Barros | 719/313 |
| 2008/0148259 | A1* | 6/2008 | Hankins et al. | 718/100 |
| 2009/0172713 | A1* | 7/2009 | Kim et al. | 719/331 |
| 2009/0327665 | A1* | 12/2009 | Sperber et al. | 712/222 |
| 2010/0070753 | A1* | 3/2010 | Kido et al. | 713/150 |

OTHER PUBLICATIONS

Gosling, James, et al., "The Java Language Specification Third Edition", Prentice Hall, 2005 (Entire book).

Tollis, I.G., et al., "Graph Drawing: Algorithms for the Visualization of Graphs", Prentice Hall, 1998, pp. 280-293.

S. Sinha and M. J. Harrold, "Analysis of programs with exception-handling constructs," in Proceedings of the International Conference on Software Maintenance, Nov. 1998, pp. 348-357.

B. G. Ryder, D. Smith, U. Kremer, M. Gordon, and N. Shah, "A static study of Java exceptions using JESP," in Proceedings of the 9th International Conference on Compiler Construction, Mar. 2000, pp. 67-81.

C. F. Schaefer and G. N. Bundy, "Static analysis of exception handling in Ada," Software—Practice and Experience, vol. 23, No. 10, pp. 1157-1174, Oct. 1993.

H. Shah, C. Gorg, and M. J. Harrold, "Why do developers neglect exception handling?" in Proceedings of the 4th International Workshop on Exception Handling, Nov. 2008, pp. 6248.

S. Sinha, A. Orso, and M. J. Harrold, "Automated support for development, maintenance, and testing in the presence of implicit control flow," in Proceedings of the 26th International Conference on Software Engineering, May 2004, pp. 336-345.

(Continued)

*Primary Examiner* — Boris Pesin
*Assistant Examiner* — Daeho Song
(74) *Attorney, Agent, or Firm* — Thomas, Kayden, Horstemeyer & Risley, LLP (57) ABSTRACT

Disclosed are various embodiments for visualization of exception-handling constructs. In one embodiment, among others, a system includes at least one computing device; a program maintained in a memory accessible to the at least one computing device; and logic executable in the at least one computing device configured to analyze the program to determine exception-handling information; generate a graphical user interface based upon the exception-handling information; and provide the graphical user interface for display on a display device.

14 Claims, 6 Drawing Sheets

OTHER PUBLICATIONS

D. Reimer and H. Srinivasan, "Analyzing exception usage in large Java applications," in Workshop on Exception Handling in Object Oriented Systems, Aug. 2003, pp. 10-19.

M. P. Robillard and G. C. Murphy, "Designing robust Java programs with exceptions," in Proceedings of the 8th ACM SIGSOFT International Symposium on Foundations of Software Engineering, Nov. 2000, pp. 2-10.

S. Sinha and M. J. Harrold, "Analysis and testing of programs with exception handling constructs," IEEE Transactions on Software Engineering, vol. 26, No. 9, pp. 849-871, Sep. 2000.

C. Fu and B. G. Ryder, "Exception-chain analysis: Revealing exception handling architecture in Java server applications," in Proceedings of the 29th International Conference on Software Engineering, May 2007, pp. 23&239.

M. P. Robillard and G. C. Murphy, "Analyzing exception flow in Java programs," in Proceedings of the 7th European Software Engineering Conference held jointly with the 7th ACM SIGSOFT International Symposium on Foundations of Software Engineering, Sep. 1999, pp. 322-337.

M.P. Robbilard, et al., "Static analysis to support the evolution of exception structure in object-oriented systems," ACM Transactions on Software Engineering and Methodology, vol. 12, No. 2, pp. 191-221, Apr. 2003.

C. Fu and B. G. Ryder, "Navigating error recovery code in Java applications," in Proceedings of the 2005 OOPSLA Workshop on Eclipse Technology exchange, Oct. 2005, pp. 40-44.

C. Fu and B. G. Ryder, "Testing and understanding error recovery code in Java applications," in Exception Handling in Object Oriented Systems: Developing Systems that Handle Exceptions, Jul. 2005, pp. 15-26.

B.-M. Chang, J.-W. Jo, and S. H. Her, "Visualization of exception propagation for Java using static analysis," in Proceedings of the Second IEEE International Workshop on Source Code Analysis and Manipulation, Oct. 2002, pp. 173-182.

I. Vessey, "Expertise in debugging computer programs: A process analysis," International Journal of Man-Machine Studies, vol. 23, No. 5, pp. 459494, Nov. 1985.

S. G. Eick, J. L. Steffen, and J. Eric E. Sumner, "Seesoft—a tool for visualizing line oriented software statistics," IEEE Transactions on Software Engineering vol. 18, No. 11, pp. 957-968, Nov. 1992.

B. Shneiderman, "The eyes have it: A task by data type taxonomy for information visualizations," in Proceedings of the IEEE Symposium on Visual Languages, Jul. 1996, pp. 336-343.

R. Lintern, J. Michaud, M.-A. Storey, and X. Wu, "Plugging-in visualization: Experiences integrating a visualization tool with Eclipse," in Proceedings of the 2003 ACM Symposium on Software Visualization, Jun. 2003, pp. 47-56.

M. W. Van Someren, Y. F. Barnard, and J. A. C. Sandberg, The Think Aloud Method: a Practical Guide to Modelling Cognitive Processes. Academic Press, London, San Diego, Aug. 1994.

R. Vallee-Rai, P. Co, E. Gagnon, L. Hendren, P. Lam, and V. Sundaresan, "Soot—a Java bytecode optimization framework," in Proceedings of the Conference of the Center for Advanced Studies on Collaborative Research, Nov. 1999, pp. 125-135.

* cited by examiner

SYSTEMS AND METHODS FOR VISUALIZATION OF EXCEPTION HANDLING CONSTRUCTS

STATEMENT REGARDING FEDERALLY SPONSORED RESEARCH OR DEVELOPMENT

This invention was made with U.S. Government support under agreement nos. CCR-0205422, CCF-0429117, CCF-0541049, and CCF-0725202, awarded by the National Science Foundation. The Government has certain rights in this invention.

BACKGROUND

Object-oriented programming languages, such as Java or C#, provide native constructs for handling exceptions that occur during a program's execution. These constructs specify mechanisms to define exceptions, to raise exceptions, to address exceptions by executing designated code, and to return to the regular control flow of the program after an exception is raised. While developers make frequent use of these exception handling constructs, the mechanisms to handle an exception are not applied locally within a program, but are scattered across different methods, classes, or even packages. Despite the native support of programming languages, exception handling constructs and their behaviors at runtime are often the least understood parts of a program. Visualization of exception handling can aid in understanding the complex mechanisms of exception handling in a large software system, allowing the developer to efficiently maintain, test, and debug the system.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Disclosed herein are various embodiments of methods related to visualization of exception-handling constructs. Reference will now be made in detail to the description of the embodiments as illustrated in the drawings, wherein like reference numbers indicate like parts throughout the several views.

Object-oriented programming languages utilize exceptions to handle the occurrence of conditions that change the normal flow of program execution. In general, an exception is handled by saving the current state of execution and switching (or throwing) the execution to a specific subroutine or exception (or catch) handler. There exist two different kinds of exceptions: exceptions that are explicitly thrown in the code (checked exceptions) and exceptions generated by the virtual machine at runtime, such as out of memory exceptions (unchecked exceptions). In the current disclosure, exception-handling constructs are discussed in the context of the Java programming language. However, one of ordinary skill in the art would understand that the principles discussed in relation to Java can be expanded to include other object-oriented programming languages.

The following program illustrates the way in which exceptions are used in a Java program that computes the factorial of an integer. The class definition of the exception and the method to read the input data are omitted because of space constraints. This program will be used for the discussion of exception-handling constructs.

```
    public class Fac {
        private static int i,fac;
        public static void main(String args[ ]) {
1.          i = fac = 1;
2.          int n = readInt( );
3.          try {
4.              while ( i <= n ) {
5.                  mult( );
6.                  i++;
                }
            }
7.          catch ( ValueExceededException vee ) {
8.              System.out.println( "value exceeded" );
9.              return;
            }
10.         finally {
11.             System.out.println( "Program terminated." );
            }
        }
        private static void mult( ) throws
                ValueExceededException {
12.         if ( fac * i > MAXVAL )
13.             throw ( new ValueExceededException( ) );
14.         fac = fac * i;
15.         System.out.println( "fac(" +i+ ")=" + fac );
        }
    }
```

In Java, checked exceptions are modeled as regular objects and can be raised using the throw statement (e.g., line 13 of the above program). To handle exceptions, Java provides try, catch, and finally statements. A try block (e.g., lines 3-6) contains a sequence of statements and is executed until an exception is thrown or until the block is completed. A try block is followed by one or more catch blocks, by a finally block, or by both. A catch block (e.g., lines 7-9) is associated with a try block, defines the type of the exception it handles, and contains a set of statements. A finally block (e.g., line 10-11) is also associated with a try block and contains a set of statements.

If an exception occurs in a try block, the associated catch blocks are checked for a matching type (i.e., for the exception type or a superclass of the exception type). If a matching catch block is found, its body is executed and the program continues its execution with the statement following the try block. Otherwise, the call stack is searched for a matching catch block. If a match is found, the program continues with the execution of that catch block's code; otherwise, the program terminates. If a finally block is present in a try-catch-finally sequence, its code is always executed: either after the try block (if no exception is raised or no matching catch block is found for a raised exception) or after the catch block (if a matching catch block is found for a raised exception). Thrown exceptions can be deactivated by a matching catch handler or by a finally block containing a statement that transfers the control flow outside the finally block (e.g., a return or a continue statement).

Figure 1:
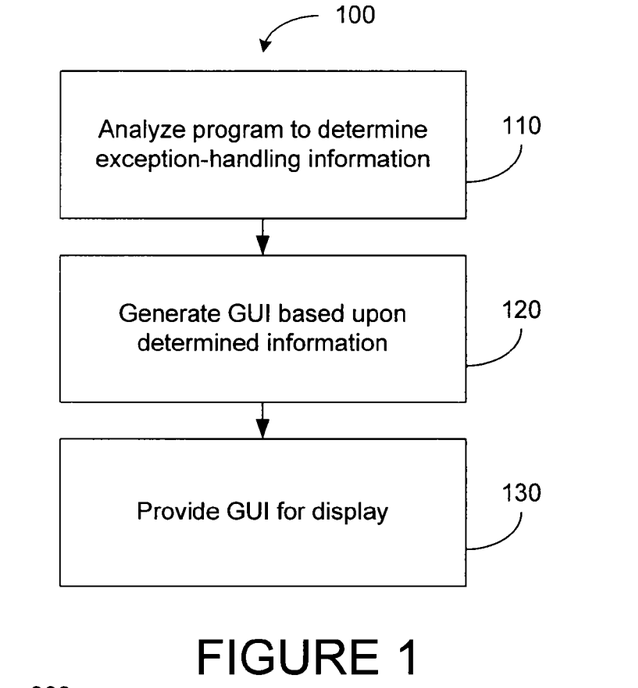
FIG. 1 is a flow diagram 100 illustrating a method for visualization of exception flows and the related exception-handling constructs within a program using a graphical user interface (GUI) in accordance with an embodiment of the present disclosure.

FIG. 1 is a flow diagram 100 illustrating a method for visualization of exception flows and the related exception-handling constructs within a program. Initially, in block 110, a program is analyzed to determine the exception-handling constructs and their relationships within the program. An analysis tool, operating on a computer system, is used to analyze the program to determine the exception-handling construct information (e.g., flow of the exception and code location). The flow of an exception consists of two parts: (1) the flow from the exception's type definition to reachable throw statements and (2) the flow from those throw statements to reachable catch statements. A throw statement is reachable from a type definition if an execution path exists from the type definition to the throw statement; a catch statement is reachable from a throw statement if an execution path exists from the throw statement to the catch statement and no statement along the path deactivates the raised exception. Analysis techniques related to exception flow are presented in "Exception-chain Analysis: Revealing Exception Handling Architecture in Java Server Applications" by C. Fu and B. G. Ryder in the Proc. of the ICSE 2007, "Automated Support for Development, Maintenance, and Testing in the Presence of Implicit Control Flow" by S. Sinha, A. Orso, and M. J. Harrold in the Proc. of the ICSE 2004, and "Static Analysis to Support the Evolution of Exception Structure in Object-Oriented Systems" by M. P. Robillard and G. C. Murphy in the ACM Trans. on Software Eng. and Methodology, April 2003, all of which are incorporated herein by reference.

In block 120, a graphical user interface (GUI) is generated by a computer system based upon the determined exception-handling information. The GUI provides three views, each offering a different perspective on exception flows and the related exception-handling constructs. The views represent the exception-related information with three levels of detail: a high-level (quantitative) representation that provides quantitative information about exception constructs with respect to overall program structure, an intermediate-level (flow) view focuses on flow information of different exception-handling constructs, and a low-level (contextual) representation that provides contextual details with respect to each exception-flow within the program. The intermediate view provides more specific details than the high-level quantitative view but abstracts the contextual details of the low-level view. This approach lets a user focus only on the flow details of the exception-handling constructs in the program (type, throw, catch, and finally). The intermediate-level view not only facilitates concentrating on the exception-handling constructs and their flow information, but also provides a smooth mental transition from the general high-level quantitative information to the specific low-level contextual information.

The GUI is provided for display on a display device in block 130. The user may then interact with the GUI to gather general insights that developers might need to better understand exception-handling constructs within the context of the analyzed program. For example, the tri-level visualization helps users to understand cyclic dependencies, tight coupling among structural elements, exception construct concentration in a particular element, and structural complexity of the program with respect to exceptions. High-level views are useful to see information about the number of exceptions of a particular type within a method, a class, or a package. Lower-level visualizations showing detailed contextual information about an exception's origin, its type, and its complete propagation path aid in better understanding of the exception flows. Additionally, such views also aid in quickly understanding change-impact details (e.g., how modifying a catch block's type may affect the set of exceptions it may handle).

Figure 2:
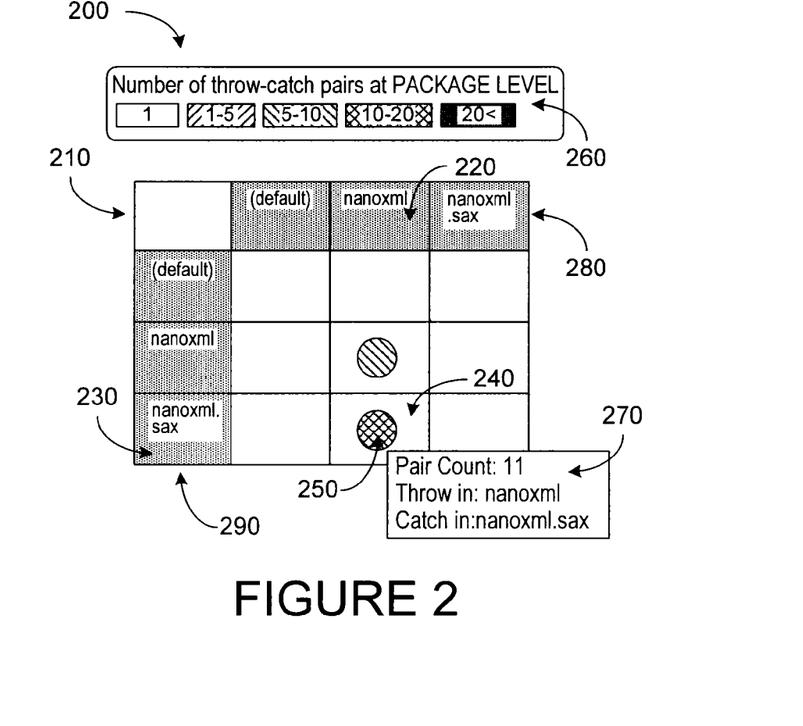
FIG. 2 illustrates a high-level view of the GUI of FIG. 1 in accordance with an embodiment of the present disclosure.
Figure 3:
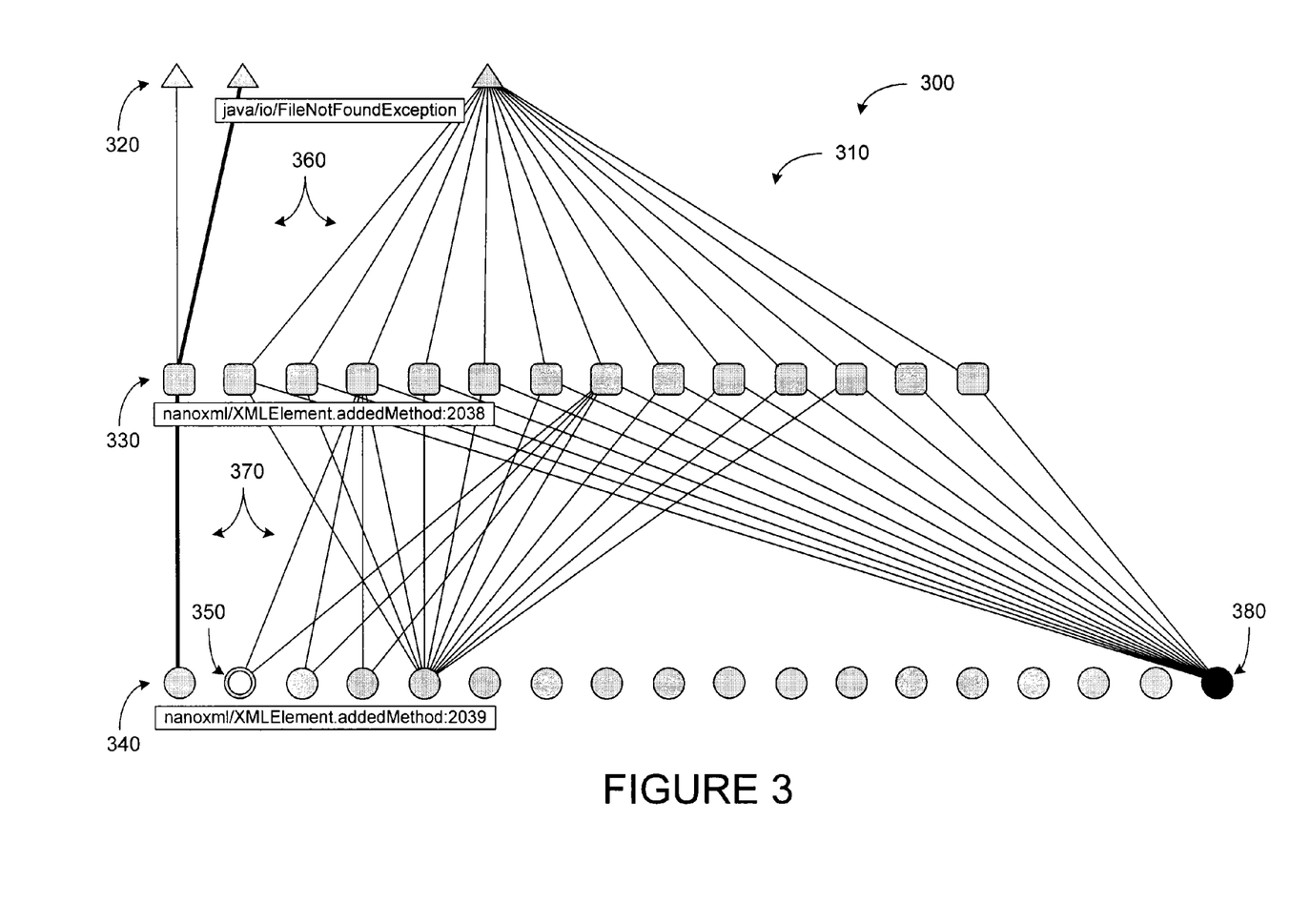
FIG. 3 illustrates an intermediate-level view of the GUI of FIG. 1 in accordance with an embodiment of the present disclosure.
Figure 4:
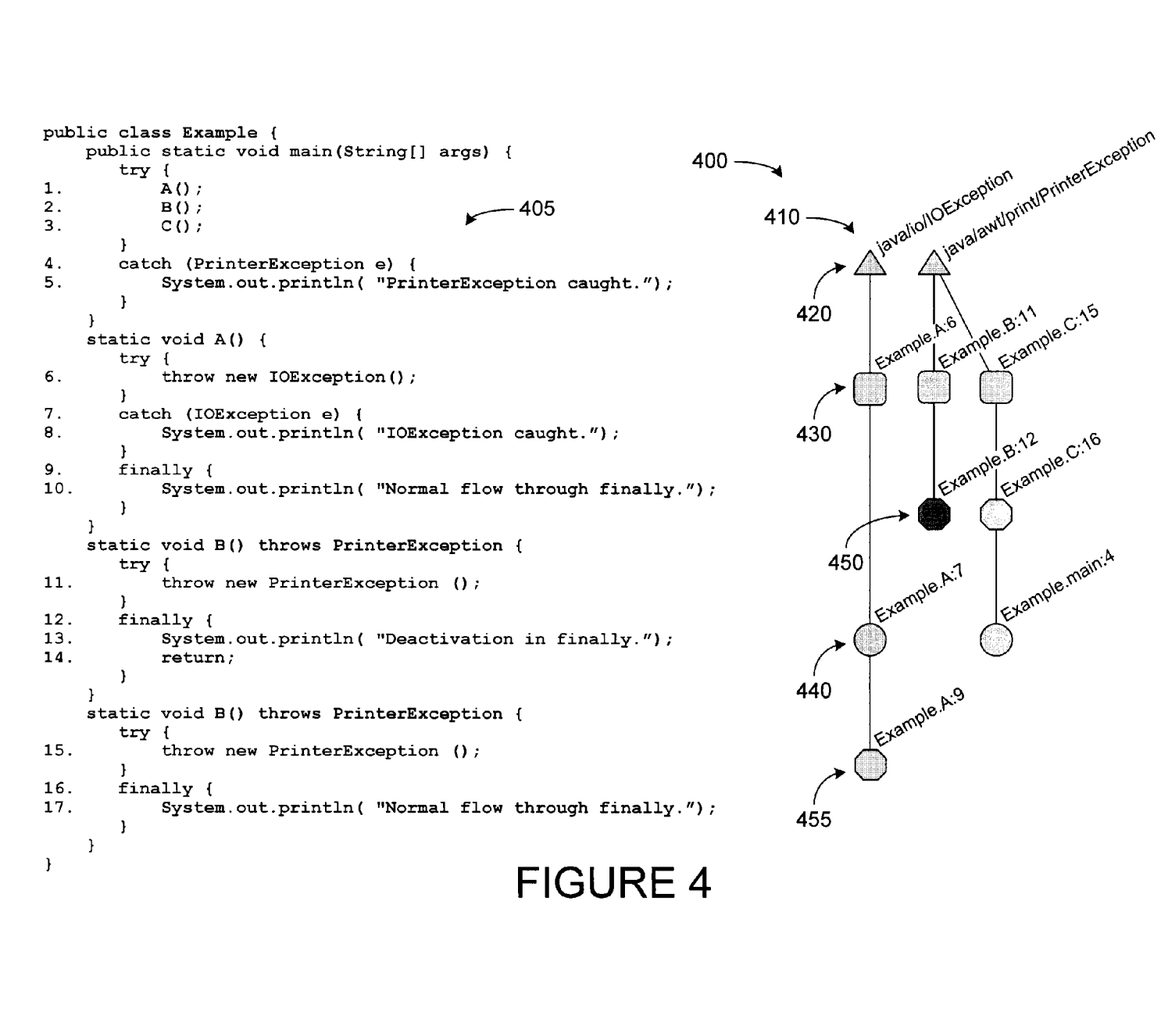
FIG. 4 illustrates another intermediate-level view of the GUI of FIG. 1 in accordance with an embodiment of the present disclosure.

In FIGS. 2-4, exemplary embodiments of the three exemplary views of visualization (quantitative, flow, and contextual) are presented with respect to a version of the Java program nanoxml3 to present examples of the different views. The nanoxml program has approximately 2700 lines of code, three packages, five classes, and 85 methods. The packages include the default package in the program and two other packages designated as nanoxml and nanoxml.sax.

FIG. 2 illustrates an exemplary embodiment of the high-level qualitative view 200 of the GUI of FIG. 1 in accordance with the present disclosure. The quantitative view 200 provides information about throw-catch pairs at different structural levels of a program's hierarchy (i.e., package level, class level, and method level). This high-level view 200 also gives an overview, in the form of a matrix 210, of the exception dependencies between structural elements. The columns in the matrix 210 represent structural elements 220 containing throw statements and the rows represent structural elements 230 containing catch statements. Thus, a cell 240 (i.e., column-name, row-name) in the matrix represents throw-catch pairs between the two intersecting structural elements 220 and 230. In other embodiments, the columns in the matrix 210 represent structural elements containing catch statements and the rows represent structural elements containing throw statements.

In the embodiment of FIG. 2, a circle 250 in a cell 240 indicates that there exists at least one throw-catch pair between the two intersecting structural elements 220 and 230. In some embodiments, the visualization uses distinct shades of a color to provide relative information of the throw-catch pair density. Alternatively, a color scale including a different color associated with each level may be utilized. The shade or color may be allocated using a three step process: (1) calculate the range of the number of throw-catch pairs, (2) partition this range into a predetermined number of discrete sets of values, and (3) assign one shade or color to each set such that the darkness of the shade or the color scale increases with the set values. In other embodiments, the color or shade scale is predetermined. In the example of FIG. 2, the shading scale 260 is divided into five discrete sets. Thus, a circle 250 with the darkest shade indicates that the intersecting structural elements 220 and 230 are strongly exception-dependent on each other.

In some embodiments, the high-level visualization 200 uses a static color scheme where the number of throw-catch pairs in the entire program under consideration is used to calculate the range of number of throw-catch pairs. This choice of color scheme assures that the color assignment is consistent across the different structural levels. In some cases, however, using such a static scheme could result in most cells belonging to the same set of values and making them indistinguishable. To address this, other embodiments use a dynamic color scheme where the number of throw-catch pairs in the currently displayed set of packages, classes, or methods is used to calculate the range of number of throw-catch pairs. The dynamic color scheme may be an on-demand feature or automatically implemented by the GUI.

The quantitative view 200 of FIG. 2 is a plain design that does not display additional information in the circles 250 to allow the view to scale a reasonable size. In other embodiments, the circle 250 may include the display of information (e.g., the number of throw-catch pairs between intersecting structural elements) or, alternatively, the circle 250 may be replaced by the number of throw-catch pairs between the two intersecting structural elements 220 and 230. Using cells 240 with a size of approximately 15×15 pixels, the quantitative view 200 can display a matrix 210 of up to 50 packages at standard screen resolution when the labels for the columns elements 220 are presented vertically.

The exemplary embodiment of FIG. 2 shows the quantitative view 200 for nanoxml at the package level: each of the three rows and columns in the matrix represents one package in the subject. The first package, labeled "(default)", represents the default package in the program. The two other packages are labeled as "nanoxml" and "nanoxml.sax". The circle 250 at cell 240 between the two intersecting structural elements [nanoxml, nanoxml.sax] 220 and 230 indicates that the package nanoxml 220 may throw exceptions that are caught by catch blocks within the package nanoxml.sax 230. Similarly, the circle between the two intersecting structural elements [nanoxml, nanoxml] indicates that the package nanoxml 220 may throw exceptions that are caught by catch blocks within the same package (nanoxml). With the exception-dependency information that the qualitative view 200 provides, a user can get an overview of how well the program is implemented with respect to exception-handling constructs. For example, if all circles on the package level are on the top-left to bottom-right diagonal in the matrix 210, the program has no cross-package dependencies in terms of exceptions.

The qualitative view 200 may also be implemented at a class level or at a method level. The qualitative view 200 may be toggled or switched between levels. At the class level, each of the rows and columns in the matrix represents a class. At the class level, the qualitative view 200 visualizes the catch-throw pairs between some or all of the classes in the program at the intersecting cells. Similarly, at the method level, the qualitative view 200 visualizes the catch-throw pairs between methods in the program. In some embodiments, all methods of the program are displayed, while in others, methods of selected classes are displayed. Throw-catch pairs within the same class or between different classes may be visualized. For example, the methods of one or more classes may be displayed as throws and the methods for the same or a different combination of classes may be displayed as catches. Because the matrix in the quantitative view 200 can be large, in some embodiments, filters can be used to address scalability. For example, filters may be selected to (1) filter structural elements by their names (e.g., consider only elements that have the term "parse" in their names), (2) reduce the size of the matrix by showing only the rows and columns that have at least one entry, and/or (3) select specific elements of interest.

The GUI can provide for a plurality of operations that allow the user to interact with the quantitative view 200. For example, moving the mouse to place the cursor icon over a cell 240 may cause a tooltip 270 to display with exception-handling information such as, but not limited to, the actual number of throw-catch pairs between the two intersecting structural elements. In the exemplary tooltip 270 of FIG. 2, there are 11 throws in the nanoxml.XMLElement class that may be caught by catch blocks in the nanoxml.sax.SAX-Parser class. Selecting an element may allow the user to view different level views. For example, a single click can select an element (multiple selections are possible using the CTRL key function), and a double click can switch to the next lower level while keeping the selected elements in focus. In such a scheme, a SHIFT double click can switch to the next higher level (using the up-arrow of the SHIFT key as metaphor). The user may make multiple selections by using a "rubberband" mechanism (e.g., using a mouse to press and drag).

To help the user navigate between different level views of the GUI, the quantitative visualization 200 may use color variations on the row and column headers of the matrix 210 (i.e., the topmost row 280 and the leftmost column 290 in the matrix 210) to indicate differences in their levels. For example, dark orange for the package level, light orange for the class level, and cream for the method level. The selected color variations belong to the same color group and take the level hierarchy into account (e.g., the higher the level is in the hierarchy, the darker is its color).

While the quantitative view 200 displays information about the throw-catch pairs at different structural levels, it does not provide information about the types and flows of the exceptions. FIG. 3 illustrates an exemplary embodiment of the intermediate-level flow view 300 of the GUI of FIG. 1 in accordance with the present disclosure. The flow view 300 provides further details about exception-handling constructs by showing a graph 310 (i.e., the exception-flow graph) that includes nodes representing four components of exception handling: exception types 320, throw statements 330, catch statements 340, and finally statements (not shown in FIG. 3).

The flow view 300 represents the components using different shapes: triangles for type nodes 320, squares for throw-statement nodes 330, and circles for catch-statement nodes 340. In addition, octagons may be used for finally-statement nodes. In other embodiments, a different combination of shapes may be used to represent the nodes. Circles with a white hole in the center (e.g., circle 350) represent empty catch handlers (i.e., catch blocks that do not contain any executable statements). An edge 360 between a type node 320 and a throw-statement node 330 indicates that an exception of that type reaches that throw statement in the program. If an exception type is not explicitly defined but the throw statement throws the exception directly using its constructor, the edge 360 between the throw node 330 and the type node 320 is colored differently (e.g., gray instead of black) to indicate that no explicit flow exists. An edge 370 between a throw-statement node 330 and a catch-statement node 340 indicates that an exception thrown at that throw statement can reach that catch statement.

In the embodiment of FIG. 3, all nodes (320, 330, and 340) have the same coloring except for an exit node 380, which has a different color indicating that it is a special kind of catch-statement node, or a finally-statement node, which has a different color indicating that it has at least one path that deactivates an exception (e.g., using a return statement). For example, all nodes (320, 330, and 340) may be colored green except for the exit node 380 or a finally-statement node, which may be colored in red. Edges 370 from throw nodes 330 reaching an exit node 380 indicate that exception occurring at those throw statements may go uncaught and thus, reach the program's exit. In addition, in some embodiments, inappropriate coding patterns such as, but not limited to, empty catch handlers, deactivations of exceptions in finally blocks, rethrows of exceptions in catch blocks, and exceptions that reach the program's exit are highlighted.

A hierarchical graph layout algorithm may be utilized to determine the layout for the exception-flow graph 310. If no finally-statement is present in the exception flow, the graph 310 consists of three layers of nodes, which are assigned to one of the three layers: all type nodes 320 are assigned to the top layer, all throw-statement nodes 330 are assigned to the middle layer, and all catch-statement nodes 340 are assigned to the bottom layer. Within a layer, the nodes may be sorted to minimize edge crossings using a heuristic algorithm. In some embodiments, the names of some or all of the nodes may be displayed. The node names may be displayed over the edges or may be toggled to display behind the edges or, alternatively, removed from the view.

The exemplary embodiment of FIG. 3 shows the flow view 300 for the program nanoxml. In some embodiments, flow view 300 can be reached by selecting both circles in the quantitative view 200 of FIG. 2 and switching to the flow view 300. The highlighted path (shown with thicker edges in FIG. 3) shows that an exception of type "java/io/FilenotFoundException" can be thrown from the throw-statement 330 at line 2038 in method nanoxml/XMLElement.addedMethod and this exception can be caught at the catch-statement at line 2039 in method nanoxml/XMLElement.addedMethod.

In the flow view 300, users can select nodes or edges using the cursor icon and a single mouse click. Selecting a node (320, 330, 340) highlights all exception-flow paths (360, 370) to which the selected node belongs. Selecting an edge (360, 370) highlights only the two adjacent nodes. Selection of multiple nodes and/or edges is possible using the CTRL key function.

The flow view 300 may be provided with different layouts of the graph 310. For example, the nodes (320, 330, 340) are arranged to minimize edges crossings in the graph 310. In other layouts, the nodes (320, 330, 340) may be clustered accordingly to their package and class structure. In some embodiments, the nodes (320, 330, 340) are clustered by class and ordered by the line number of the statements they represent. As can be seen in FIG. 3, a single catch-statement node 340 can catch throws from multiple throw-statement nodes 330 and a throw-statement node 330 can throw to multiple catch-statement nodes 340. Furthermore, the exception from all throw-statement nodes 330 except one may reach the program exit node 380 and there seem to be some unreachable catch handlers.

To learn more about the unreachable catch handlers, the flow view 300 may be focused on the flow to catch handlers while also taking rethrows into account. Catch handlers may rethrow a caught exception, which can be indicated by a dotted or dashed line from the catch node 340 to the throw node 330. In some embodiments, the rethrow may be colored (e.g., red) to distinguish it from other edges 370. In this way, catch handlers that catch runtime exceptions and use a rethrow can be visualized.

The flow view 300 visually displays the exception-handling flow information to allow users to infer information about the statements represented by the nodes. For example, a catch-statement node 340 with several incoming edges 370 may indicate the impact of that catch block on the rest of the exception flow in the program. Many edges into a catch-statement node 340 can indicate that the node 340 represents a catch-statement that is responsible for handling a number of exceptions and thus, changing such a catch block may impact different parts of the program. In addition, tracing complete paths of a node tuple [type 320, throw 330, catch 340] in the flow view 300 may help to determine the type of a catch block. For example, a catch-statement node 340 handling different types of exceptions implies that catch block's type is a supertype of all the exception types it handles.

The flow view 300 may also help in observing patterns in the flow of exceptions within a program. For instance, edges 370 from one throw-statement node 330 to different catch-statement nodes 340 indicate that there are different paths that an exception at that throw-statement 330 may follow, depending on the program conditions. Three perspectives of an exception-flow graph 310 (each producing a subgraph of the exception-flow graph) may be selected to aid the user:

1) a type-centric perspective with respect to a type-node definition statement $s_D$: the node set of this subgraph consists of the set of defined type-nodes $s_D$ itself, all throw nodes that are reachable from $s_D$, and all catch nodes that are reachable from those throw nodes;
2) a throw-centric perspective with respect to a throw-node definition statement $s_T$: the node set of this subgraph consists of the set of type-nodes that can reach the set of defined throw-nodes $s_T$, $s_T$ itself, and all catch nodes that are reachable from $s_T$; and
3) a catch-centric perspective with respect to catch-node definition statement $s_C$: the node set of this subgraph consists of the set of throw-nodes that can reach the set of defined catch-nodes $s_C$, all type-nodes that can reach those throw nodes, and $s_C$ itself.

The edge sets of these perspectives are derived from the feasible control flow defined by the given node sets. The type centric perspective leads to two patterns: single type to single throw and single type to multiple throws. The throw centric perspective leads to four patterns: single type to single throw; multiple types to single throw; single throw to single catch; and single throw to multiple catch. The catch centric perspective leads again to two patterns: single throw to single catch and multiple throws to single catch. The different perspectives may be selected by a user through the GUI.

FIG. 4 illustrates another exemplary embodiment of the intermediate-level flow view 400 of the GUI of FIG. 1, which includes the visualization of finally statements. The program 405 in FIG. 4 is used as an example to illustrate how finally statements are integrated in the flow view 400. The program 405 includes three methods A, B, and C that are called in the try block of the main method. Method A throws an exception in a try block, the exception is caught in a catch block, the finally block is executed, and the method returns. Method B throws an exception and deactivates it using a return statement in the finally block. Method C throws an exception, executes the finally block, and the exception is caught in the main method.

The graph 410 of flow view 400 corresponds to the program 405. One or more additional layers may be added to visualize the finally nodes. In the embodiment of FIG. 4, two additional layers (between the throw and catch node layers and after the catch node layer) are added for the finally nodes 450 and 455 to reflect the two possible flows. If a try block has both a catch and a finally block, and the exception is caught in the catch block, then the finally block is executed after the catch block. If the catch block does not catch the exception (because the type does not match) or no catch block is present, the finally block is executed after the try block and before the control flow leaves the method. The leftmost nodes represent the flow in method A (throw 430, catch 440, finally 455), the nodes in the middle represent the flow in method B (throw 430, deactivation in finally 450), and the rightmost nodes represent the flow in method C (throw 430, finally 450, catch 440). As can be seen, because methods B and C are of the same type, they both flow from a single type node 420.

Figure 5:
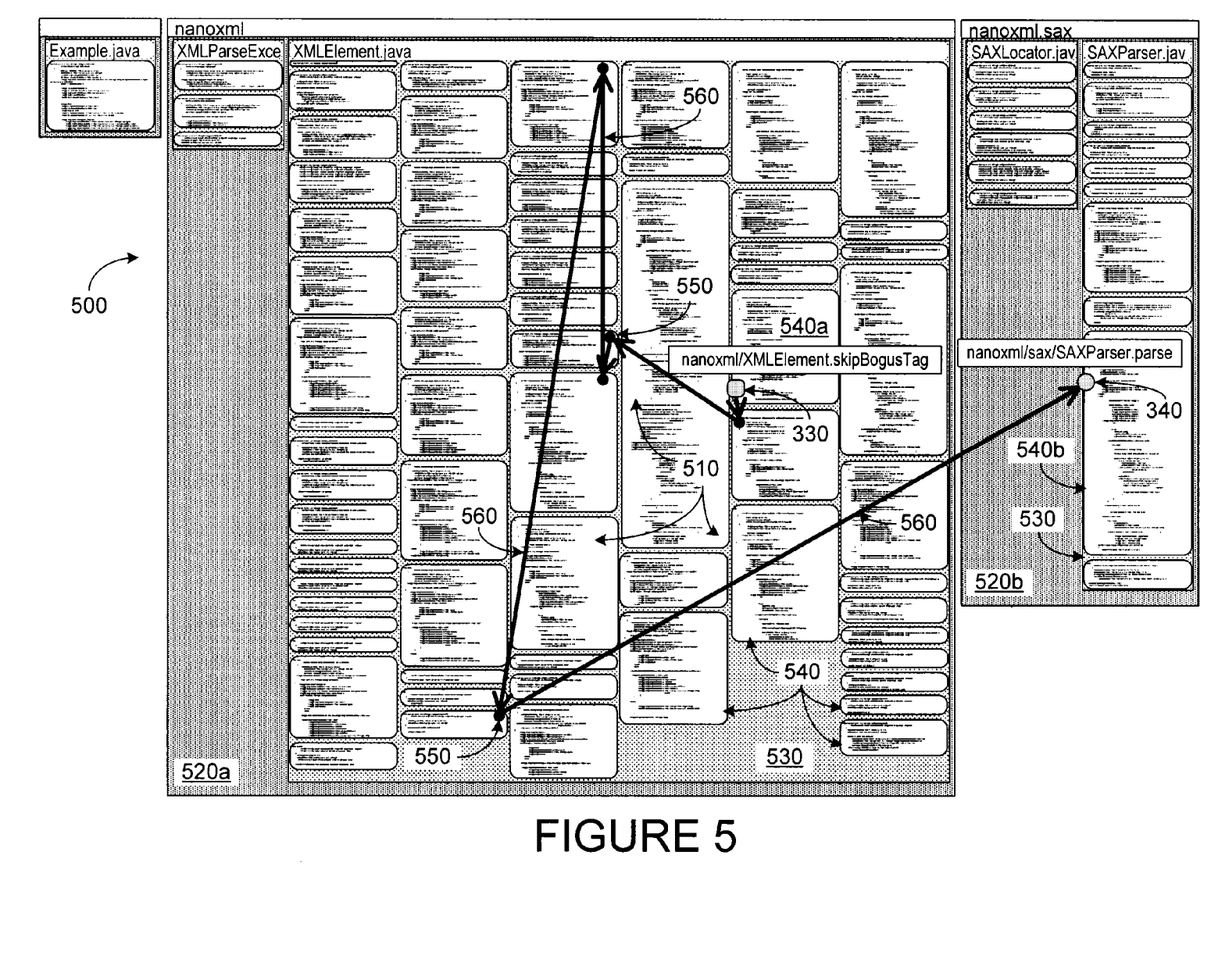
FIG. 5 illustrates a low-level view of the GUI of FIG. 1 in accordance with an embodiment of the present disclosure.

FIG. 5 illustrates an exemplary embodiment of a low-level contextual view 500 of the GUI of FIG. 1 in accordance with the present disclosure. While a flow view displays flow information about the exceptions at the statement level with respect to throw and catch statements, flow information in the presence of the statements' context with respect to the programs hierarchical structure (e.g., to which class and method a statement belongs) is not shown. The contextual view 500 provides information about the complete propagation path of an exception including the methods through which the exception may propagate before reaching the catch (i.e., methods that use the throw construct) by extending the exception-flow graph to show exception-propagation information in an exception-propagation graph 510. This graph 510 is embedded in a hierarchical representation of the source code of the program.

In the exemplary embodiment of FIG. 5, the hierarchy, representing the package, class, and method levels, is composed of three levels of rectangles embedded within each other. An outermost rectangle 520 represents a package, intermediate rectangles 530 represent the classes within the package, and innermost rectangles 540 represent the methods within these classes. To help the user navigate between different level views of the GUI, the contextual view 500 may use color variations to indicate differences in their levels as in the quantitative visualization 200 of FIG. 2. For example, dark orange may be used for outermost rectangles 520 representing the highest package level, light orange may be used for the intermediate rectangles 530 representing the class level, and cream may be used for the innermost rectangles 540 representing the method level. The selected color variations belong to the same color group and take the level hierarchy into account (e.g., the higher the level is in the hierarchy, the darker is its color). Within the method rectangles 540, the contextual view 500 visualization may display the method's code in a small font. Although the code may not be readable, the preserved line structures and indentations of the code help to quickly identify locations in the source code. In some embodiments, the GUI may allow a user to zoom in on the code text. Code outside of method blocks, such as the variable declaration and import statements, may be ignored because it does not directly relate to exception-handling constructs.

In some embodiments, a simple heuristic can be used to recursively compute the layout of the hierarchy of the contextual view 500. The maximal height of an outermost rectangle 520 representing a package is defined using the available screen real estate of the GUI. Based on this maximal height, the technique computes the height of the intermediate rectangles 530 representing each class. The innermost rectangles 540 representing methods are arranged in columns within the intermediate class rectangles 530. In some embodiments, the innermost method rectangles 540 may be wrapped accordingly to the maximal height. The intermediate class rectangles 530 may be arranged the same way in the outermost package rectangles 520.

The exception-propagation graph 510 consists of nodes and edges. Nodes are exception-related or non-exception related. In some embodiments, exception-related nodes use the same color and shape representation as the associated flow view (e.g., flow view 300 of FIG. 3): squares represent throw-statements nodes 330, circles represent catch-statement nodes 340, and octagons represent finally statements. For example, as with flow view 300, the nodes may be colored green unless they are involved in an inappropriate coding pattern in which case they are colored red. Non-exception related nodes 550, represented as smaller black circles, denote the methods within the propagation path of the exception flow. Edges 560 indicate the flow of the exception along its propagation path.

The exemplary contextual view 500 of FIG. 5 illustrates the propagation path of an exception across two packages. The contextual view 500 shows two packages, nanoxml and nanoxml.sax (outermost rectangles 520a and 520b, respectively), of the nanoxml program and their contained classes and methods. The embedded exception flow graph 510 shows that a throw (node 330) in the method XMLElement.skipBogusTag (innermost rectangle 540a) in package nanoxml (outermost rectangles 520a) is caught by the catch block (node 340) in method SAXParser.parse (innermost rectangle 540b) in package nanoxml.sax (outermost rectangles 520b) after it is propagated through five other methods. Embedding the exception flow graph 510 into the contextual view 500 of the entire source code helps the developer to maintain a mental model of the visualization when switching from one flow to another. Embedding graph 510 also lets the user visualize multiple flows at once and as such supports comparison. In addition, the propagation of catch-throw-finally and throw-finally relationships may be similarly depicted in the contextual view 500 of the program.

In some embodiments, moving the cursor icon over an element in the contextual view 500 displays further details of that element in a tooltip. For example, the name and line number may be displayed for throw-statement nodes 330 and catch-statement nodes 340 and the method name may be displayed for nodes 550 representing intermediate points in the propagation path. Similarly, information about a package, class, or method may be presented by selecting the appropriate rectangle.

The contextual view 500 aids the user in understanding how different parts of a program are involved in exception flows. For example, the contextual view 500 can show how any changes made, with respect to exceptions, to the intermediate methods involved in the exception-propagation path (e.g., removing a throw construct and introducing a catch block) may affect the flow of the exception. The contextual view 500 may also help to understand an inappropriate coding pattern such as a large distance between throw and catch pair. The exception-propagation path provides the context of this large-distance pattern by showing the methods through which the exception propagates and helps the developer to decide whether refactoring is necessary.

Figure 6:
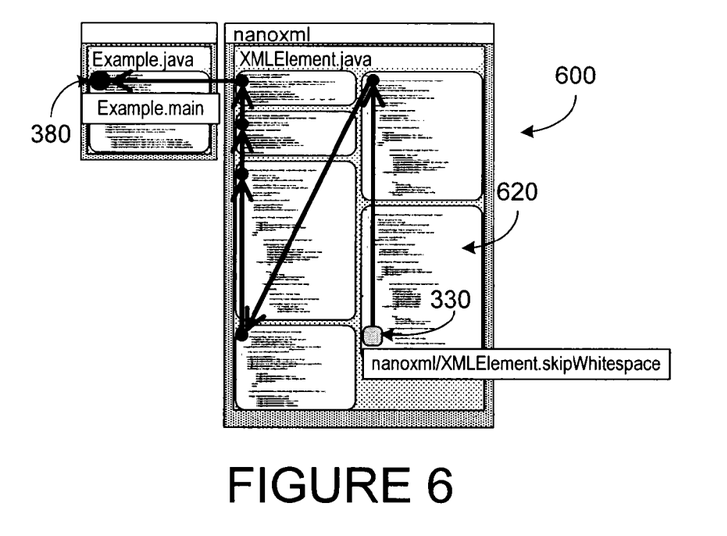
FIG. 6 illustrates a condensed contextual view of the GUI of FIG. 1 in accordance with the present disclosure.

Because the approach may not scale for larger programs, a user may select to view a condensed contextual view that includes only methods that are involved in the exception flow. FIG. 6 illustrates an exemplary embodiment of a condensed contextual view 600. In the exemplary condensed contextual view 600, a throw (node 330) in method XMLElement.skipWhitespace (innermost rectangle 620) in package nanoxml reaches the program exit (node 380) after it is propagated through five other methods; only the methods involved in the propagation are shown in this condensed contextual view 600.

Figure 7:
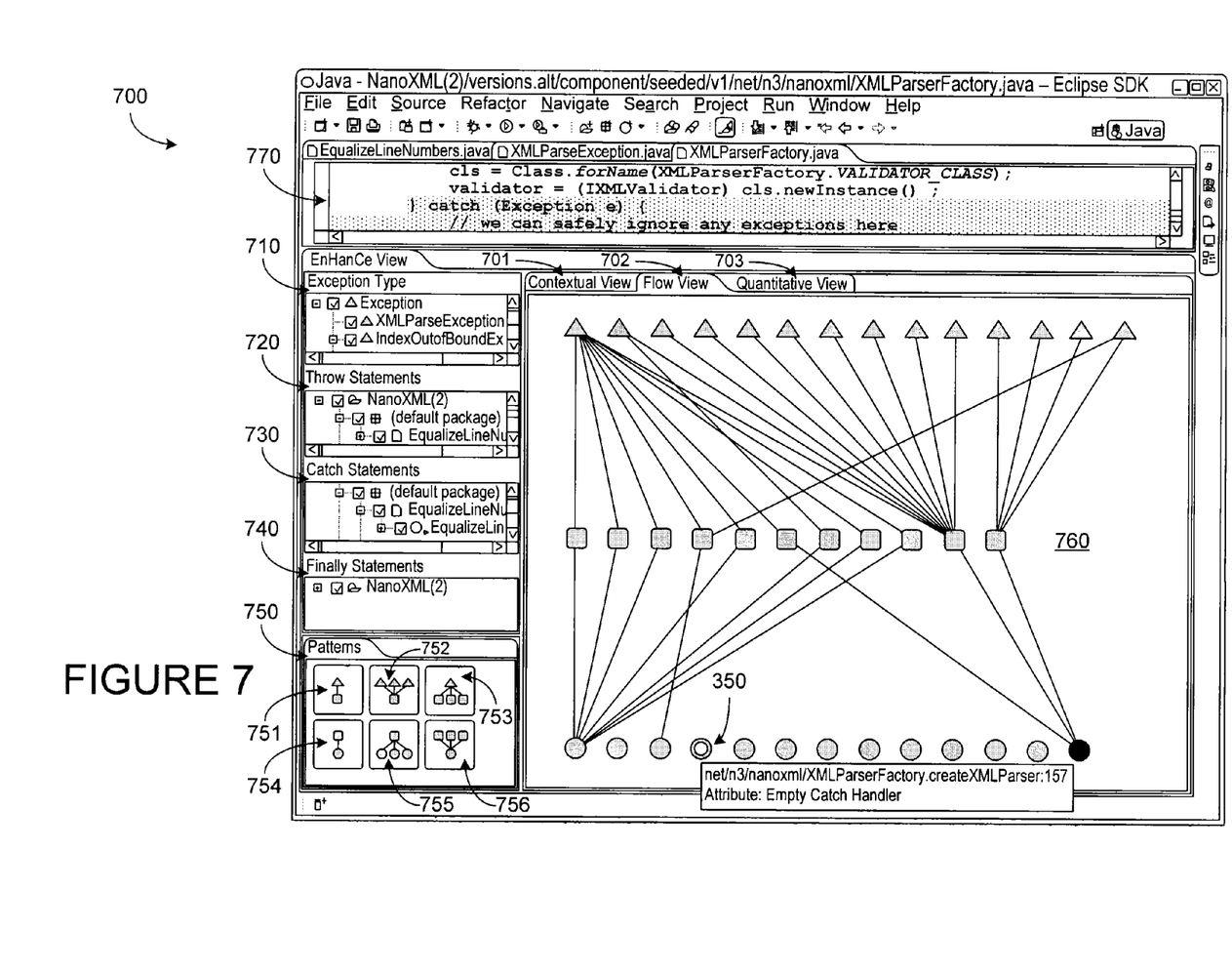
FIG. 7 illustrates a view of a GUI of FIG. 1 in accordance with an embodiment of the present disclosure.

A graphical user interface (GUI) may be used to implements the three views: qualitative, flow, and contextual. FIG. 7 illustrates a view of a GUI 700 in accordance with an embodiment of the present disclosure. In the exemplary embodiment of FIG. 7, the three views are integrated as three separate tabs 701, 702, and 703 in a single GUI display 700. The GUI 700 allows a user to select one of the three visualizations (i.e., the quantitative view, the flow view, or the contextual view) using tabs 701, 702, and 703. In other embodiments, two or more views may be simultaneously displayed by the GUI.

In addition, the left column of the exemplary GUI 700 provides five filters for controlling the three views:

An Exception Type filter 710 that allows a user to select an exception type(s) for which details will be provided in the three views;

Three location filters for throw-statements 720, catch-statements 730, and finally statements 740 that allow a user to select one or more structural elements to which the throw, catch, and finally statements belong. The related quantitative, flow and contextual views provide filtered information about the exception-handling constructs of the selected structural elements based upon the filter definitions; and A patterns filter 750 that allows a user to select a pattern and view exception flows that form the selected pattern. The patterns represent the six edge flow patterns discussed previously. In the embodiment of FIG. 7, the top row of the patterns filter represents the patterns of single type to single throw 751, multiple types to single throw 752, and single type to multiple throws 753. The bottom row of the patterns filter represents the patterns of single throw to single catch 754, single throw to multiple catch 755, and multiple throw to single catch 756. This filter 750 is specific to the flow view and is disabled when one of the other views is used.

The GUI 700 may also provide two kinds of filtering mechanisms: filtering by selecting and interacting directly with the entities in one of the three views (as described previously) or filtering by using any combination of the five provided filters 710-750. Because the three views in the embodiment of FIG. 7 are organized as tabs 701, 702, and 703, it is possible to switch between the views while maintaining the same context defined by the filters. In other embodiments, two or more views may be simultaneously displayed by the GUI.

In the example of FIG. 7, the tab 702 for the flow view has been selected. An exemplary flow view 760 for the nanoxml program is displayed with the focus on the edges. The flow view 760 shows that five of the six edge set patterns discussed above exist in the nanoxml program (the multiple types to single throw pattern is not present). The visualization of GUI 700 also shows that there exists only one empty catch handler (node 350). Its code is shown in the editor view 770 located at the top of the GUI window 700 in FIG. 7.

Figure 8:
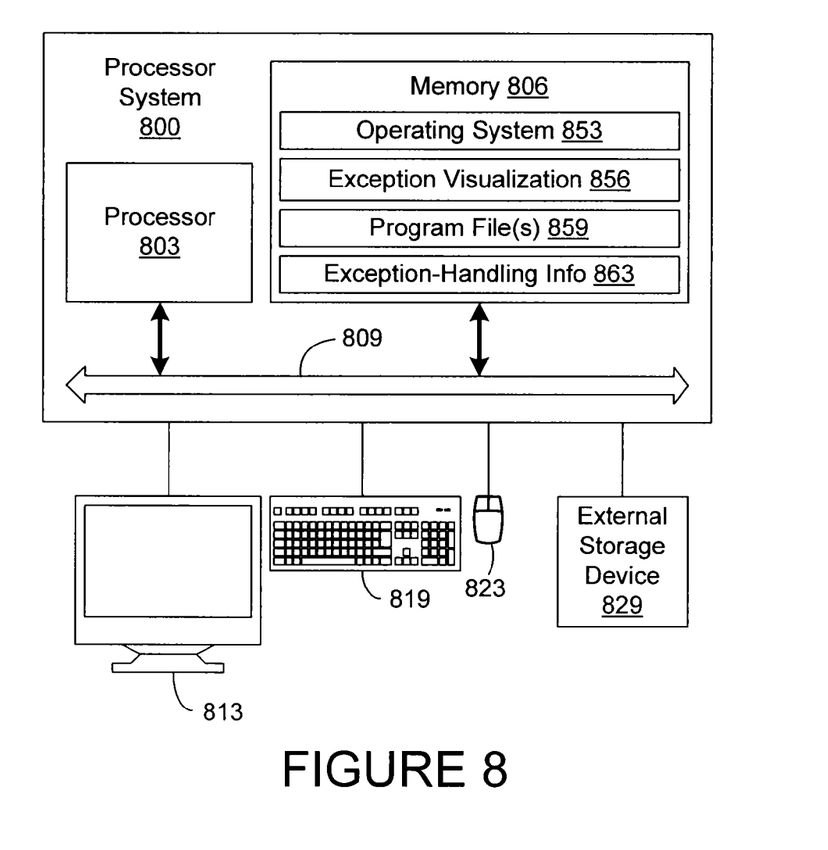
FIG. 8 is a schematic block diagram of one example of a system employed to visualize exception flows and the related exception-handling constructs according to an embodiment of the present disclosure.

Referring next to FIG. 8, shown is one example of a system that performs various functions related to visualization of exception handling constructs according to the various embodiments as set forth above. As shown, a processor system 800 is provided that includes a processor 803 and a memory 806, both of which are coupled to a local interface 809. The local interface 809 may be, for example, a data bus with an accompanying control/address bus as can be appreciated by those with ordinary skill in the art. The processor system 800 may comprise, for example, a computing device such as a desktop computer, laptop, personal digital assistant, server, or other system with like capability.

Coupled to the processor system 800 are various peripheral devices such as, for example, a display device 813, a keyboard 819, and a mouse 823. In addition, other peripheral devices that allow for the storage of exception-handling information or program files may be coupled to the processor system 800 such as, for example, an external storage device 829.

Stored in the memory 806 and executed by the processor 803 are various components that provide various functionality according to the various embodiments of the present invention. In the example embodiment shown, stored in the memory 806 is an operating system 853 and an exception visualization system 856. In addition, stored in the memory 806 are various program files 859 and exception-handling information 863. The program files 859 may be analyzed for visualization by the graphical user interface. The exception-handling information 863 may be associated with corresponding ones of the program files 859. The program files 859 and the exception-handling information 863 may be stored in the external storage device 829 as needed.

The exception visualization system 856 is executed by the processor 803 in order to visualize exception-handling constructs as described above. A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, or source code that may be expressed in proper format such as object code that is capable of being loaded into a of random access portion of the memory 806 and executed by the processor 803, etc. An executable program may be stored in any portion or component of the memory 806 including, for example, random access memory, read-only memory, a hard drive, compact disk (CD), floppy disk, or other memory components.

The memory 806 is defined herein as both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 803 may represent multiple processors and the memory 806 may represent multiple memories that operate in parallel. In such a case, the local interface 809 may be an appropriate network that facilitates communication between any two of the multiple processors, between any processor and any one of the memories, or between any two of the memories etc. The processor 803 may be of electrical, optical, or molecular construction, or of some other construction as can be appreciated by those with ordinary skill in the art.

The operating system 853 is executed to control the allocation and usage of hardware resources such as the memory, processing time and peripheral devices in the processor system 800. In this manner, the operating system 853 serves as the foundation on which applications depend as is generally known by those with ordinary skill in the art.

Referring back to FIG. 1, shown is a flow chart 100 that may be viewed as depicting steps of an example of a method implemented in the processor system 800 (FIG. 8) for visualization of exception-handling constructs as set forth above. The functionality of the method as depicted by the example flow chart of FIG. 1 may be implemented, for example, in an object oriented design or in some other programming architecture. Assuming the functionality is implemented in an object oriented design, then each block represents functionality that may be implemented in one or more methods that are encapsulated in one or more objects. The exception visualization system may be implemented using any one of a number of programming languages such as, for example, C, C++, or other programming languages.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
    at least one computing device including at least one processor;
    a program maintained in a memory accessible to the at least one computing device; and
    logic executable in the at least one computing device configured to:
        analyze the program to determine exception-handling information about exception-handling constructs within the program and relationships between the exception-handling constructs within the program;
        generate a graphical user interface (GUI) based upon the exception-handling information, the GUI including a qualitative view of the exception-handling constructs within the program, wherein the qualitative view includes a matrix that represents throw-catch relationships of the exception-handling constructs at a package level, a flow view of the exception-handling constructs within the program, wherein the flow view includes an exception-flow graph that graphically represents type-throw-catch relationships of the exception-handling constructs, and a contextual view of the exception-handling constructs within the program, wherein the contextual view includes an exception-propagation graph of a catch-throw relationship of the exception-handling constructs, the exception-propagation graph embedded within a hierarchical representation of the source code of the program; and
        provide the GUI for display on a display device.

2. The system of claim 1, wherein the GUI is configured to switch between the qualitative view, the flow view, and the contextual view in response to a user input.

3. The system of claim 1, wherein the qualitative view includes a matrix that represents throw-catch relationships of the exception-handling constructs at a class level.

4. The system of claim 1, wherein the qualitative view includes a matrix that represents throw-catch relationships of the exception-handling constructs at a method level.

5. The system of claim 1, wherein the GUI is configured to switch the qualitative view between a package level view, a class level view, and a method level view in response to a user input.

6. The system of claim 1, wherein the GUI is configured to filter the flow view to graphically represent a selected exception-flow pattern in response to a user input.

7. The system of claim 6, wherein the selected exception-flow pattern is one of the group consisting of single type to single throw patterns, multiple types to single throw patterns, single type to multiple throws patterns, single throw to single catch patterns, single throw to multiple catch patterns, and multiple throw to single catch patterns.

8. The system of claim 1, wherein the exception-flow graph graphically represents type-throw-catch-finally relationships of the exception-handling constructs.

9. The system of claim 1, wherein the GUI is configured to highlight all type-throw-catch relationships associated with a selected node of the exception-flow graph in response to a user input.

10. The system of claim 1, wherein the contextual view includes a plurality of exception-propagation graphs embedded in the hierarchical representation, each exception-propagation graph corresponding to a catch-throw relationship of the exception-handling constructs.

11. The system of claim 1, wherein the contextual view is a condensed contextual view including only methods of the program that are involved in the exception propagation through the program.

12. The system of claim 1, wherein the contextual view includes an exception-propagation graph of a catch-throw-finally relationship of the exception-handling constructs, the exception-propagation graph embedded within a hierarchical representation of the source code of the program.

13. A non-transitory computer readable storage medium embodying logic executable by a computer system, the logic comprising:
    code that analyzes a program to determine exception-handling information about exception-handling constructs within the program and relationships between the exception-handling constructs within the program;
    code that generates a graphical user interface (GUI) based upon the exception-handling information, the GUI including a qualitative view of the exception-handling constructs within the program, wherein the qualitative view includes a matrix that represents throw-catch relationships of the exception-handling constructs at a package level, a flow view of the exception-handling constructs within the program, wherein the flow view includes an exception-flow graph that graphically represents type-throw-catch relationships of the exception-handling constructs, and a contextual view of the exception-handling constructs within the program, wherein the contextual view includes an exception-propagation graph of a catch-throw relationship of the exception-handling constructs embedded within a hierarchical representation of the source code of the program; and
    code that provides the graphical user interface for display on a display device.

14. The non-transitory computer readable storage medium of claim 13, wherein the GUI is configured to switch between the qualitative view, the flow view, and the contextual view in response to a user input.

* * * * *